(12) United States Patent
Anderson

(10) Patent No.: US 6,801,487 B2
(45) Date of Patent: Oct. 5, 2004

(54) INTEGRATED OPTICAL DISC LABEL SCANNER SYSTEM AND METHOD OF SCANNING AN OPTICAL DISC GRAPHIC DISPLAY

(75) Inventor: Daryl E. Anderson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 432 days.

(21) Appl. No.: 10/059,610

(22) Filed: Jan. 28, 2002

(65) Prior Publication Data

US 2003/0142613 A1 Jul. 31, 2003

(51) Int. Cl.[7] .............................................. G11B 7/00
(52) U.S. Cl. ...................... 369/47.12; 369/84; 369/125
(58) Field of Search ............................ 369/47.1, 47.12, 369/47.13, 53.1, 53.11, 53.2, 53.21, 53.37, 53.45, 59.1, 83, 84, 85, 125

(56) References Cited

U.S. PATENT DOCUMENTS 5,967,676 A   10/1999  Cutler et al. ................. 400/70
6,122,042 A * 9/2000  Wunderman et al. ......... 356/73
6,155,487 A * 12/2000 Dean et al. ................. 235/383
6,633,853 B2 * 10/2003 Oshima et al. ............... 369/84

* cited by examiner

Primary Examiner—Muhammad Edun

(57) ABSTRACT

An integrated optical disc label scanner system can comprise a substrate configured for spinning an optical disc, wherein the optical disc has a graphic display on a first surface; an emitting device configured for reflecting energy from the graphic display; a detecting device configured to receive energy sourced from the emitting device and reflected from the graphic display while the optical disc is spinning; and a signal processor configured for converting the energy collected by the detecting device into digitized data. Further, a method of scanning a graphic display from an optical disc can comprise the steps of spinning an optical disc having a graphic display on a first surface; radiating the first surface with emitted energy resulting in graphic display reflected energy; collecting the graphic display reflected energy while the optical disc is spinning; and converting the graphic display reflected energy into digitized data.

24 Claims, 2 Drawing Sheets

INTEGRATED OPTICAL DISC LABEL SCANNER SYSTEM AND METHOD OF SCANNING AN OPTICAL DISC GRAPHIC DISPLAY

FIELD OF THE INVENTION

The present invention is drawn to a system and method for scanning an optical disc graphic display. More specifically, the present invention is drawn to integrated optical disc label scanner systems and methods of scanning graphic displays found on optical discs.

BACKGROUND OF THE INVENTION

Optical discs are becoming an industry standard for data storage in the fields of computers, video and film, and music, for example. Specifically, optical discs can have data patterns embedded on one side of a disc, and a graphic display printed on the other side of the disc. Formats currently available for optical disc storage include DVD, CD, CD-ROM, CD-R, and CD-RW, to name a few. Writable and rewritable DVD optical discs, though currently less prevalent in the marketplace, are also available. Once an optical disc is recorded and finalized for general use, the optical disc typically contains ROM or read only memory. In this condition, the computer, video, or music data patterns on the bottom side of the disc can become fixed. In some instances, data can be recorded on both sides of an optical disc, such that approximately double the storage capacity can be utilized. However, when this configuration is used, printed patterns must be eliminated or substantially reduced to an inner or outer ring area. Thus, in many instances, it is desirable to limit the optical disc data to a single side of the optical disc such that printed patterns or graphic display information can be printed on the non-data side of the disc. The printed patterns or graphic display on the non-data side of an optical disc can be both decorative and provide pertinent information about the data content contained on the disc.

As technology has advanced, recordable, writable, and rewritable optical discs and equipment for recording or writing onto optical discs has become reasonably priced, leading to increased consumer interest. Thus, many consumers currently have the ability to copy an optical disc with home office equipment. However, a need still exists to provide an easy and effective way to gather graphic display information from optical discs for the purpose of viewing on a monitor, printing on a substrate including another optical disc, editing, and the like.

SUMMARY OF THE INVENTION

It has been recognized that it would be advantageous to develop an apparatus, system, and method for scanning optical disc graphic display information for various uses. Such uses can include viewing of the image on a monitor, printing of the image on a substrate such as another optical disc or optical disc adhesive label, editing of the image, and the like.

The invention provides an integrated optical disc label scanner system, comprising a substrate configured for spinning an optical disc, wherein the optical disc has a graphic display on a first surface; an emitting device positioned near the substrate and configured for propagating energy for reflection from the graphic display; and a detecting device positioned near the emitting device and configured to receive reflected energy sourced from the emitting device and reflected from the graphic display while the optical disc is spinning. The system can further comprise a signal processor coupled to the detecting device and configured for converting the energy collected by the detecting device into digitized data corresponding to the graphic display. In addition, the system can further comprise at least one additional detecting device positioned near the emitting device and configured to receive reflected energy sourced from the emitting device and reflected from the graphic display while the optical disc is spinning.

In accordance with a more detailed aspect of the present invention, the system can include a track for moving the emitting device and the detecting device radially with respect to the optical disc. Optionally, the emitting device and the detecting device can be ganged together on a sled for controlled movement along the track, such that the graphic display information can be collected spirally from the first surface of the optical disc.

In another more detailed aspect, a plurality of fixed emitting devices and corresponding detecting devices can be positioned radially with respect to an outer boundary and an inner boundary of a graphic display. Thus, as an optical disc spins, from one to all of the plurality of fixed emitting and detecting devices can be turned on and collect graphic display information one circular region at a time, or multiple circular regions at a time. If all emitting devices and detecting devices are activated simultaneously, then all of the graphic information can be collected after a single spin of the optical disc. Any functional number of revolutions of the optical disc per minute can be utilized, even rotational rates that are slower or faster than those typically used to read data.

Further, a method of scanning a graphic display from an optical disc can comprise the steps of spinning an optical disc having a graphic display on a first surface; radiating progressive portions of the spinning first surface with a form of energy which interacts with sequential portions of the graphic display to capture in reflected energy a signal format of the graphic display; collecting the signal format of the graphic display while the optical disc is spinning; and converting the signal format of the graphic display into digitized data.

In a further detailed aspect, a method of copying a graphic display from a first optical disc to a second optical disc can comprise the steps of scanning a source graphic display from a first optical disc while the first optical disc is spinning; processing scanned information collected from the source graphic display; and printing a copy graphic display on a second optical disc wherein the copy graphic display is substantially similar to the source graphic display.

Additional features and advantages of the invention will be apparent from the detailed description which follows, taken in conjunction with the accompanying drawings, which together illustrate, by way of example, features of the invention.

DETAILED DESCRIPTION OF THE PREFERRED EMBODIMENT(S)

Figure 1:
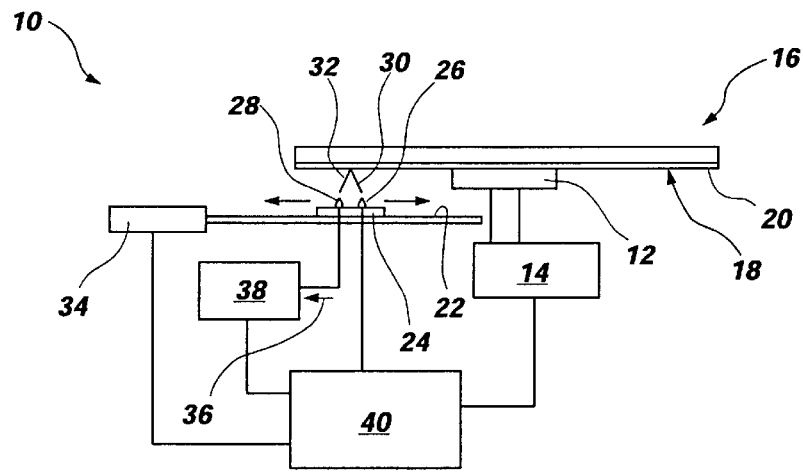
FIG. 1 is a side view of an integrated optical disc label scanner system in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention. Further, before the preferred embodiments of the present invention are disclosed and described, it is to be further understood that this invention is not limited to the particular process steps and materials disclosed herein as such process steps and materials may vary to some degree. It is also to be understood that the terminology used herein is used for the purpose of describing particular embodiments only and is not intended to be limiting as the scope of the present invention will be limited only by the appended claims and equivalents thereof.

As used in this specification and the appended claims, singular forms of "a," "an," and "the" include plural referents unless the content clearly dictates otherwise.

"Optical disc" is meant to encompass music, video, and computer discs. Examples of optical disc formats include writable, recordable, and rewritable DVD, CD, CD-ROM, CD-R, CD-RW, and the like "Graphic display" can include any character or image found on an optical disc. Typically, the graphic display is found prominently on one side of the optical disc, though this is not always the case.

"Data" is typically used with respect to the present disclosure to include the non-graphic information contained on the optical disc that is digitally or otherwise embedded. Data can include music information, film or video information, software information, and the like.

As illustrated in FIG. 1, an integrated optical disc label scanner system, indicated generally at 10, in accordance with the present invention is shown. Home optical disc use is one example of a field that may benefit from use of such a system, for example.

In accordance with one aspect of the present invention, and as shown in FIG. 1, the system 10 provides a substrate 12 and a motor 14 for spinning an optical disc, shown generally at 16. The optical disc 16 can comprise any of a number of optical disc read only memory, writable, recordable, and rewritable formats including DVD, CD, CD-ROM, CD-R, CD-RW, and the like. A first surface 18 of the optical disc 16 can include a graphic display 20. The graphic display can be any type used in the graphic display arts, such as a silk-screened image, for example. The optical disc 16 can be positioned on the substrate 12 either in a face up or a face down orientation. In FIG. 1, the optical disc 16 is in a face down orientation.

Positioned to face a portion of the graphic display 20 on the first surface 18 is a track 22 for moving a sled 24 radially with respect to the optical disc 16. An emitting device 26 and a detecting device 28 are positioned on the sled 24 such that as the sled 24 moves radially with respect to the optical disc 16 along the track, and as the optical disc 16 spins, scanning of the graphic display 20 can occur spirally. The amount of time and the number of revolutions required to scan an entire graphic display 20 from an optical disc will depend on a few variables, including the amount of area the reflected energy will cover, dot-size, speed of the spinning disc, speed of the sled movement, and amount of energy overlap on the optical disc when spiral scanning, for example. Further, as the optical disc 16 will generally be configured to spin at a constant speed, the speed of the sled movement can optionally be varied to compensate for the length of optical disc 16 scanned per revolution near the outer boundary of the graphic display compared to the distance scanned per revolution near the inner boundary of the graphic display. In other words, in one embodiment, as the sled 24 becomes closer to the center of the optical disc 16, the speed of the sled can increase. Alternatively, as the sled 24 becomes further away from the center of the optical disc 16, its speed can decrease. In another embodiment, the sled can move at a constant speed. In one or more of these embodiments, a solenoid 34 can be used to effectuate movement of the sled 24 on the track 22.

Turning specifically to the scanning elements of the system, the emitting device can aim an energy beam 30 at the graphic display 20. The energy beam 30 can be, for example, a laser or other RF beam. If laser energy is used, then the emitting device 26 can be, for example, a laser device. The energy beam 30 can strike the graphic display 20 at a spot or region creating reflected energy 32, such as reflected laser energy. Depending on the properties of the graphic display, e.g., color, brightness, focus, transmissivity of material, etc., the reflected energy 32 will be more or less intense, or will undergo a wavelength shift with certain materials. Thus, the detecting device 28 can collect this information to be later processed. In one embodiment, the emitting device can be aimed to reflect from the graphic display and substantially focus on the detecting device 28. The detecting device 28 can be, for example, a photo diode. The information collected by the photo diode can then be converted to voltage, current, or optical information, for example, which is proportional to the reflected energy. Examples of laser devices and photo diodes that can be used include those found in a typical CD, CD-ROM, or DVD player or device.

The reflected energy 32 that is collected by the detecting device 28 can be converted to a reflected energy signal 36 to be processed by a signal processor 38. The signal processor 38 can be a PC, and can process the information by amplifying, filtering, or digitizing the reflected energy information, for example. Additionally, if the graphic display is collected spirally as described previously, the signal processor can be used to de-spiralize the image and put it together in a useful and recognizable condition. Additionally, the copy of the graphic display can be edited as is desired by the user. A power source/controller 40 can be present to provide power to and control of the signal processor 38, the emitting device 26, the solenoid 34, and the motor 14, for example.

Figure 2:
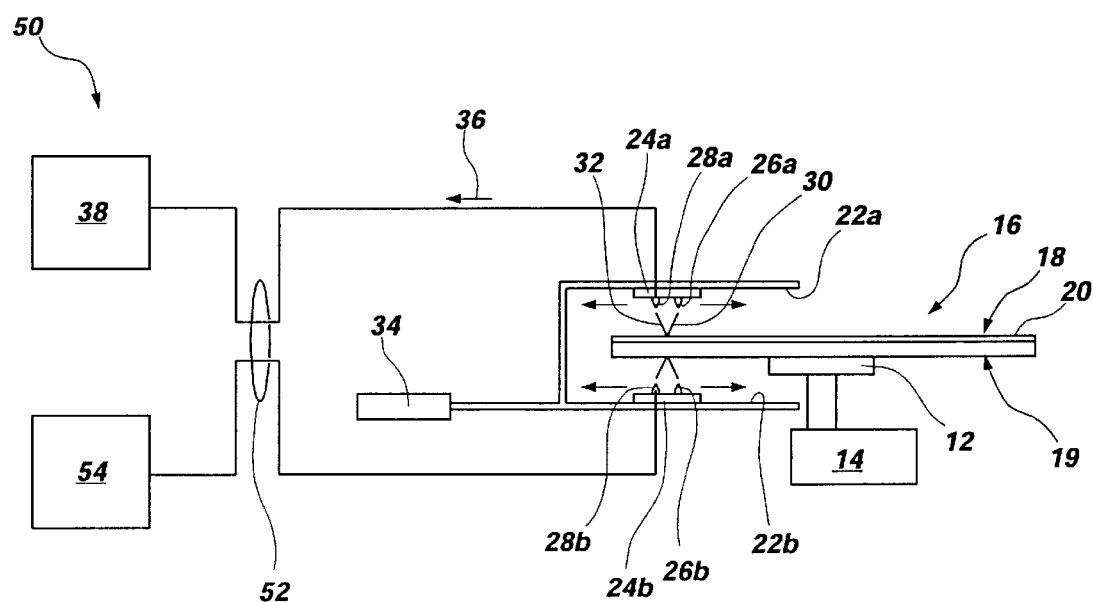
FIG. 2 is a side view of a combination integrated optical disc label scanner and optical disc data reading system in accordance with an embodiment of the present invention.

Turning to FIG. 2, an alternative system, indicated generally at 50, can comprise an integrated optical disc label scanner system that can also simultaneously collect data from the data containing side of the optical disc. In this embodiment, the optical disc 16 is shown in a standard orientation, with the graphic display 20 on the first surface 18 facing in an upward direction. Similar to FIG. 1, a motor 14 and a substrate 12 are present for spinning and supporting the optical disc 16. However, two emitting devices and two detecting devices are present. A first emitting device 26a and a first detecting device 28a face the first surface 18 of the spinning optical disc 16 having the graphic display 20 thereon. Additionally, a second emitting device 26*b* and a second detecting device 28*b* face a second surface 19 that contains the optical disc data. Each set of emitters and detectors are positioned on a first sled 24*a* and a second sled 24*b*, respectively. Additionally, the first sled 24*a* and the second sled 24*b* follow a first track 22*a* and a second track 22*b*, respectively. In this embodiment, a single solenoid 34 is shown that acts to simultaneously cause both the first sled 24*a* and the second sled 24*b* to travel and collect information in unison. However, this is not required. In an alternative embodiment, each sled can be configured to be independent of the other. In such an embodiment, the use of two solenoids or other mechanical or electrical structures can be implemented for independent function.

Both the graphic display 20 information collected from detecting device 28*a* and the data information collected from detecting device 28*b* can be sent to a processor via electrical or optical means. In one embodiment, both signals can be fed to, for example, registers, common data buses, or industry standard interface 50 such as a USB, IDE, PCI, SERIAL, PARALLEL, SCSI, AGP, or other interfaces. The scanned graphic display can then be sent to a graphics signal processor 38 and the data collected can be sent to a data signal processor 52. Both can be a PC processor, for example. As a side note, though a power source is not shown, it is understood that a power source can be present, as in FIG. 1, to provide power to any system needing power.

Figure 3:
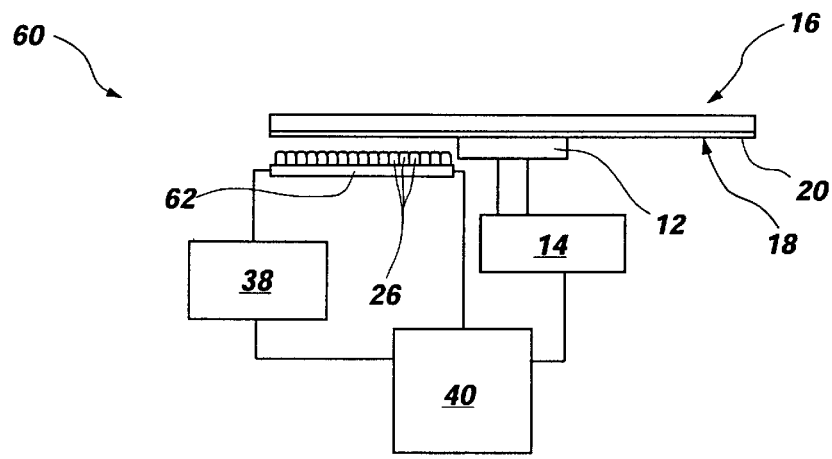
FIG. 3 is side view of an alternative embodiment of an integrated optical disc label scanner system in accordance with an embodiment of the present invention.
Figure 4:
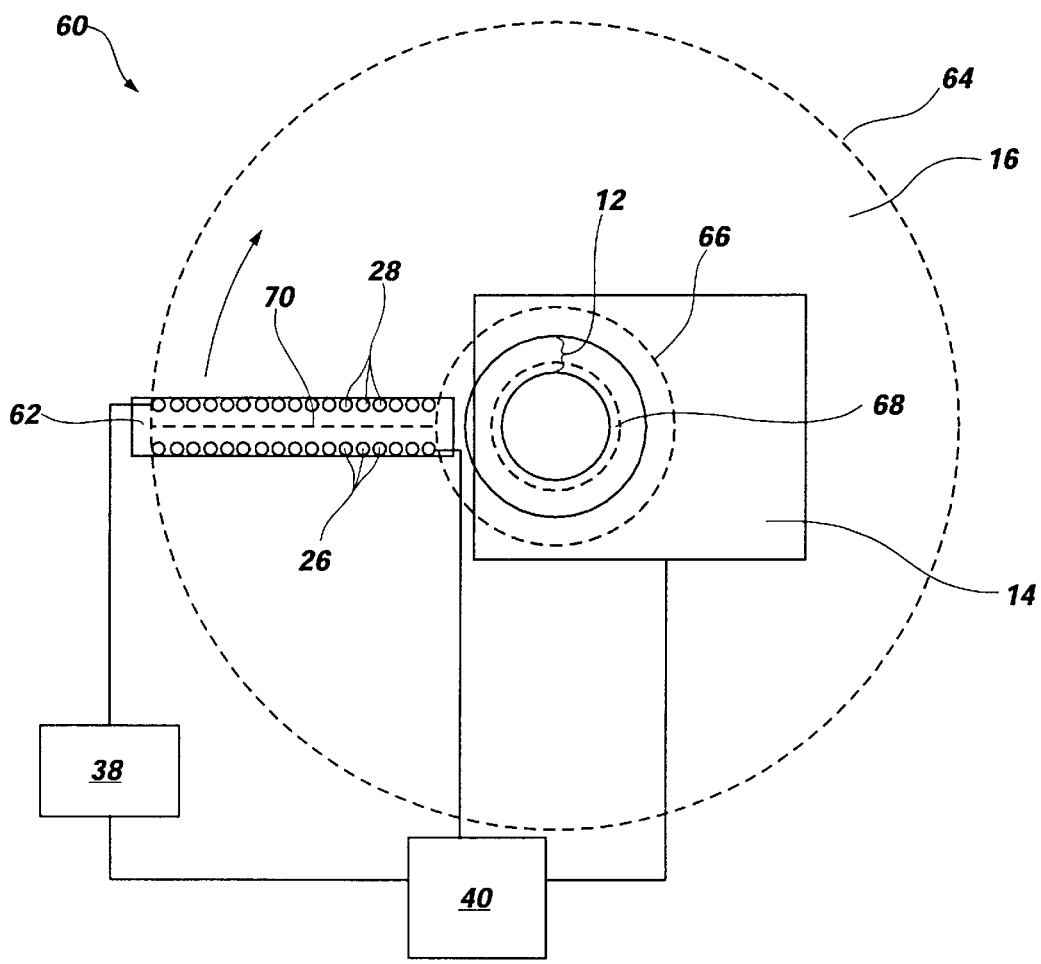
FIG. 4 is a top view of the integrated optical disc label scanner system shown in FIG. 3.

Turning to FIG. 3 and FIG. 4, an alternative embodiment of an integrated optical disc label scanner system 60 is shown. In this embodiment, the optical disc 16, graphic display 20, first surface 18, optical disc substrate 12, and motor 14 are configured similarly as described with respect to FIG. 1. However, rather than having a single emitting device, a plurality of emitting devices 26 are shown which are supported by an emitter/detector substrate 62. Detecting devices 28 are also present and are positioned on the emitter/detector substrate 62 to receive energy emitted from the emitting devices 26 and reflected from the graphic display 20 at or near a radial reflective region 70 of the optical disc 16. The radial reflective region 70 is fixed by the position of the emitter/detector substrate 62 and not by the optical disc 16, as the optical disc 16 is typically spinning on an axis while information is being collected from the graphic display 20. The emitter/detector substrate 62 can be configured to span a distance at least as great as a distance from an outer boundary 64 to an inner boundary 66 of the graphic display 20. As is typical with optical discs 16, a hole or void 68 is present that is used, in part, to interconnect the optical disc 16 to the substrate 12.

A power source/controller 40 can be present to provide power to the emitting devices 26 and control the timing and intensity of individual emitting devices. A signal processor 38 can be coupled to detecting devices 28 to interpret the information collected therefrom. Further, the signal processor 38 and the power source/controller 40 can be interconnected to communicate with one another if desired.

There are several ways of utilizing the system described in FIG. 3 and FIG. 4. For example, the emitted and detected energy can be configured such that each emitting device and detecting device provides a ring-shaped energy region on the spinning graphic display that overlaps or contacts another ring-shaped energy region of adjacent emitting and detecting devices. Thus, by emitting and detecting energy from a single emitting device and corresponding detecting device while the optical disc spins for a single rotation, a ring of scanned graphic information can be gathered. By duplicating this process for each emitting device and corresponding detecting device, a series of ring shaped scanned images can be collected and pieced together, either by computer software or by human editing, creating a digitized copy of the entire scanned image. Thus, emitting devices and corresponding detecting devices can be energized one at a time, or can be energized two or more at a time. In one embodiment, by energizing all of the emitting devices simultaneously for one optical disc revolution, the entire image can be scanned.

Color images can also be scanned by utilizing multiple photo detectors, each with a different color filter. If, for example, three color filters are used on three separate detecting devices, full color can be achieved. With such an embodiment, in may be desirable to use a white light laser or LED for the emitting device.

In addition to systems in accordance with an embodiment of the present invention, methods of collecting or scanning graphic display information and copying graphic displays are also within the scope of the invention. Particularly, a method of scanning a graphic display from an optical disc can comprise the steps of spinning an optical disc having a graphic display on a first surface; radiating progressive portions of the spinning first surface with a form of energy which interacts with sequential portions of the graphic display to capture in reflected energy a signal format of the graphic display; collecting the signal format of the graphic display while the optical disc is spinning; and converting the signal format of the graphic display into digitized data.

The emitted energy can be any such energy that is functional with the present method, but particularly, can include laser energy, for example. Additionally, the graphic display reflected energy can be collected or read by any of a number of sensors such as, for example, a photo diode.

Next, a method of copying a graphic display from a first optical disc to a second optical disc can comprise the steps of scanning a source graphic display from a first optical disc while the first optical disc is spinning; processing scanned information collected from the source graphic display; and printing a copy graphic display on a second optical disc wherein the copy graphic display is substantially similar to the source graphic display. Though any means of printing on a second optical disc can be used, in one embodiment, the printing step can further comprise spinning the second optical disc and creating the copy graphic display on the second optical disc while it is spinning. Alternatively, the second optical disc can be printed upon by proxy, such as by printing on an adhesive label and adhering it to a non-data containing side of the optical disc. Thus, the phrase "printing on" does not require that the printing be directly on the second optical disc, as long as the printed matter ultimately ends up on the second optical disc. It is to be understood that the above-described arrangements are only illustrative of an application in accordance with principles of the present invention. Numerous modifications and alternative arrangements can be devised without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth in the claims.

What is claimed is:

1. An integrated optical disc label scanner system, comprising:

(a) a substrate configured for spinning an optical disc, said optical disc having a graphic display on a first surface;

(b) an emitting device positioned near the substrate and configured for propagating energy for reflection from the graphic display; and (c) a detecting device positioned near the emitting device and configured to receive reflected energy sourced from the emitting device and reflected from the graphic display while the optical disc is spinning.

2. An integrated optical disc label scanner system as in claim 1 further comprising at least one additional detecting device positioned near the emitting device and configured to receive reflected energy sourced from the emitting device and reflected from the graphic display while the optical disc is spinning.

3. An integrated optical disc label scanner system as in claim 1 further comprising a signal processor coupled to the detecting device and configured for converting the energy collected by the detecting device into digitized data corresponding to the graphic display.

4. An integrated optical disc label scanner system as in claim 3, wherein the digitized data comprises information that is printable and wherein said printable information is substantially similar to the graphic display on the first surface of the optical disc.

5. An integrated optical disc label scanner system as in claim 3, wherein the digitized data corresponds to a spiral path of the graphic display on the surface of the optical disc.

6. An integrated optical disc label scanner system as in claim 3, wherein the digitized data corresponds to a ring of the graphic display on the surface of the optical disc.

7. An integrated optical disc label scanner system as in claim 3, wherein the digitized data is converted to a viewable image.

8. An integrated optical disc label scanner system as in claim 7, wherein the viewable image is editable.

9. An integrated optical disc label scanner system as in claim 7, wherein the viewable image is printed on a surface of a second disc.

10. An integrated optical disc label scanner system as in claim 1, wherein the emitting device is a laser emitter.

11. An integrated optical disc label scanner system as in claim 1, wherein the detecting device is a photo diode.

12. An integrated optical disc label scanner system as in claim 1, wherein the emitting device and the detecting device are ganged together and are configured for concurrent movement radially over the spinning optical disc.

13. An integrated optical disc label scanner system as in claim 1, wherein the emitting device and the detecting device are configured in a fixed position.

14. An integrated optical disc label scanner system as in claim 13, comprising a plurality of emitting devices and a plurality of detecting devices configured radially with respect to the spinning optical disc such that energy received by the detecting devices provide complete graphic display scan coverage.

15. An integrated optical disc label scanner system, comprising:

(a) a substrate configured for spinning an optical disc, said optical disc having a graphic display on a first surface;

(b) an emitting device positioned near the substrate and configured for propagating energy for reflection from the graphic display;

(c) a detecting device positioned near the emitting device and configured to receive reflected energy sourced from the emitting device and reflected from the graphic display while the optical disc is spinning; and (d) a track for radially moving the emitting device and the detecting device with respect to the optical disc.

16. An integrated optical disc label scanner system as in claim 15, further comprising a signal processor coupled to the detecting device and configured for converting the energy collected by the detecting device into digitized data corresponding to the graphic display.

17. An integrated optical disc label scanner system, comprising:

(a) a substrate configured for spinning an optical disc, said optical disc having a graphic display on a first surface, said graphic display defined by an outer boundary and an inner boundary;

(b) an emitting device positioned near the substrate and configured for propagating energy for reflection from the graphic display along a radial axis from the outer boundary to the inner boundary; and (c) a detecting device positioned near the emitting device and configured to receive reflected energy sourced from the emitting device and reflected from the graphic display while the optical disc is spinning, said detecting device configured along the radial axis from the outer boundary to the inner boundary such that the graphic display can be detected in sectional rings.

18. An integrated optical disc label scanner system as in claim 17, further comprising a signal processor coupled to the detecting device and configured for converting the energy collected by the detecting device into digitized data corresponding to the graphic display.

19. A method of scanning a graphic display from an optical disc, comprising:

(a) spinning an optical disc having a graphic display on a first surface;

(b) radiating progressive portions of the spinning first surface with a form of energy which interacts with sequential portions of the graphic display to capture in reflected energy a signal format of the graphic display;

(c) collecting the signal format of the graphic display while the optical disc is spinning; and (d) converting the signal format of the graphic display into digitized data.

20. A method as in claim 19, wherein the emitted energy is laser energy.

21. A method as in claim 19, wherein the reflected energy is collected with a photo diode.

22. A method of copying a graphic display from a first optical disc to a second optical disc, comprising:

(a) scanning a source graphic display from a first optical disc while the first optical disc is spinning;

(b) processing data collected from the source graphic display; and (c) printing a copy graphic display on a second optical disc wherein the copy graphic display is substantially similar to the source graphic display.

23. A method as in claim 22, wherein the printing step further comprises spinning the second optical disc and printing the copy graphic display while the second optical disc is spinning.

24. A method as in claim 22, wherein the scanning step is spiral scanning.

* * * * *